(12) United States Patent
Kletzander et al.

(10) Patent No.: US 11,080,082 B2
(45) Date of Patent: Aug. 3, 2021

(54) CROSS-HYPERVISOR VIRTUAL MACHINE CONVERSION

(71) Applicant: Red Hat, Inc., Raleigh, NC (US)

(72) Inventors: Martin Kletzander, Brno (CZ);
Richard W. M. Jones, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 186 days.

(21) Appl. No.: 16/530,248

(22) Filed: Aug. 2, 2019

(65) Prior Publication Data
US 2021/0034401 A1    Feb. 4, 2021

(51) Int. Cl.
*G06F 9/455* (2018.01)
*G06F 9/48* (2006.01)

(52) U.S. Cl.
CPC ...... *G06F 9/45558* (2013.01); *G06F 9/4545* (2013.01); *G06F 9/4843* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,653,794 B2 | 1/2010 | Michael et al. | |
| 8,954,718 B1 * | 2/2015 | Raj | G06F 9/45545 713/1 |
| 9,594,583 B2 * | 3/2017 | Bonzini | G06F 9/45558 |
| 9,804,992 B2 | 10/2017 | Tsai et al. | |
| 10,216,531 B2 | 2/2019 | Shilmover et al. | |
| 10,445,121 B2 * | 10/2019 | McLeod | G06F 9/45558 |
| 10,915,411 B2 * | 2/2021 | Parambil | G06F 9/45558 |
| 2018/0121223 A1 | 5/2018 | Cui et al. | |

FOREIGN PATENT DOCUMENTS

| CN | 107678837 A | 2/2018 |
|---|---|---|
| TW | 201913403 A | 4/2019 |

OTHER PUBLICATIONS

Hwang et al. "A Component-Based Performance Comparison of Four Hypervisors", 2013 IEEE, pp. 269-276.*
Fornaeus "Device Hypervisors", 2010 ACM, pp. 114-119.*
(Continued)

*Primary Examiner* — Van H Nguyen
(74) *Attorney, Agent, or Firm* — Withrow & Terranova, PLLC

(57) ABSTRACT

Cross-hypervisor virtual machine conversion. A set of disk images that define a source virtual machine (VM) in a source host computing environment is determined. For each respective disk image, a corresponding overlay image that references the respective disk image is generated. The overlay image that corresponds to a boot disk image is altered to enable a target VM process to be booted from the overlay image on a target host computing device that utilizes a second type of hypervisor. A target VM process that boots from the overlay image that corresponds to the boot disk image is initiated, and the target VM process is configured to access the set of disk images indirectly via the corresponding overlay images.

20 Claims, 9 Drawing Sheets

(56) References Cited

OTHER PUBLICATIONS

Rahman et al. "Performance Evaluation of Hypervisors and the Effect of Virtual CPU on Performance", 2018 IEEE, pp. 772-779.*
Author Unknown, "Quick Migration," Veeam Backup & Replication 9.5, Update 4, last updated Jul. 26, 2019, 2 pages.
Hines, Michael, et al., "Post-Copy Based Live Virtual Machine Migration Using Apaptive Pre-Paging and Dynamic Self-Ballooning," International Conference on Virtual Execution Environments, Mar. 2009, ACM, 10 pages.
Kargatzis, Dimitrios, et al., "Virtual Machine Migration in heterogeneous Clouds: From OpenStack to VMWare," Sarnoff Symposium, Conference Paper, Sep. 2017, Newark, New Jersey, IEEE, 6 pages.
Shah, Amit, "Live Migrating QEMU-KVM Virtual Machines," Blog Articles, Mar. 24, 2015, Red Hat Inc., 26 pages.

* cited by examiner

CROSS-HYPERVISOR VIRTUAL MACHINE CONVERSION

BACKGROUND

Virtual machines operate in conjunction with a particular hypervisor. There are circumstances where it would be desirable to convert an existing virtual machine to be able to operate in conjunction with a different hypervisor than the hypervisor with which the virtual machine is currently configured to operate.

SUMMARY

In one example a method is provided. The method includes determining, by a computing device including a processor device, a set of disk images that define a source virtual machine (VM) in a source host computing environment, including at least one boot disk image, the source VM being configured to be initiated by a first type of hypervisor. The method further includes generating, for each respective disk image in the set of disk images, a corresponding overlay image that references the respective disk image. The method further includes altering the overlay image that corresponds to the at least one boot disk image to enable a target VM process to be booted from the overlay image on a target host computing device that utilizes a second type of hypervisor. The method further includes initiating, on the target host computing device by a target hypervisor, a target VM process that boots from the overlay image that corresponds to the at least one boot disk image, the target VM process being configured to access the set of disk images indirectly via the corresponding overlay images.

In another example a computing device is provided. The computing device includes a memory and a processor device coupled to the memory. The processor device is to determine a set of disk images that define a source virtual machine (VM) in a source host computing environment, including at least one boot disk image. The source VM is configured to be initiated by a first type of hypervisor. The processor device is further to generate, for each respective disk image in the set of disk images, a corresponding overlay image that references the respective disk image. The processor device is further to alter the overlay image that corresponds to the at least one boot disk image to enable a target VM process to be booted from the overlay image on a target host computing device that utilizes a second type of hypervisor. The processor device is further to initiate, on the target host computing device by a target hypervisor, a target VM process that boots from the overlay image that corresponds to the at least one boot disk image, the target VM process being configured to access the set of disk images indirectly via the corresponding overlay images.

In another example a computer program product is provided. The computer program product is stored on a non-transitory computer-readable storage medium and includes instructions to cause a processor device to determine a set of disk images that define a source virtual machine (VM) in a source host computing environment, including at least one boot disk image, the source VM being configured to be initiated by a first type of hypervisor. The instructions further cause the processor device to generate, for each respective disk image in the set of disk images, a corresponding overlay image that references the respective disk image. The instructions further cause the processor device to alter the overlay image that corresponds to the at least one boot disk image to enable a target VM process to be booted from the overlay image on a target host computing device that utilizes a second type of hypervisor. The instructions further cause the processor device to initiate, on the target host computing device by a target hypervisor, a target VM process that boots from the overlay image that corresponds to the at least one boot disk image, the target VM process being configured to access the set of disk images indirectly via the corresponding overlay images.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
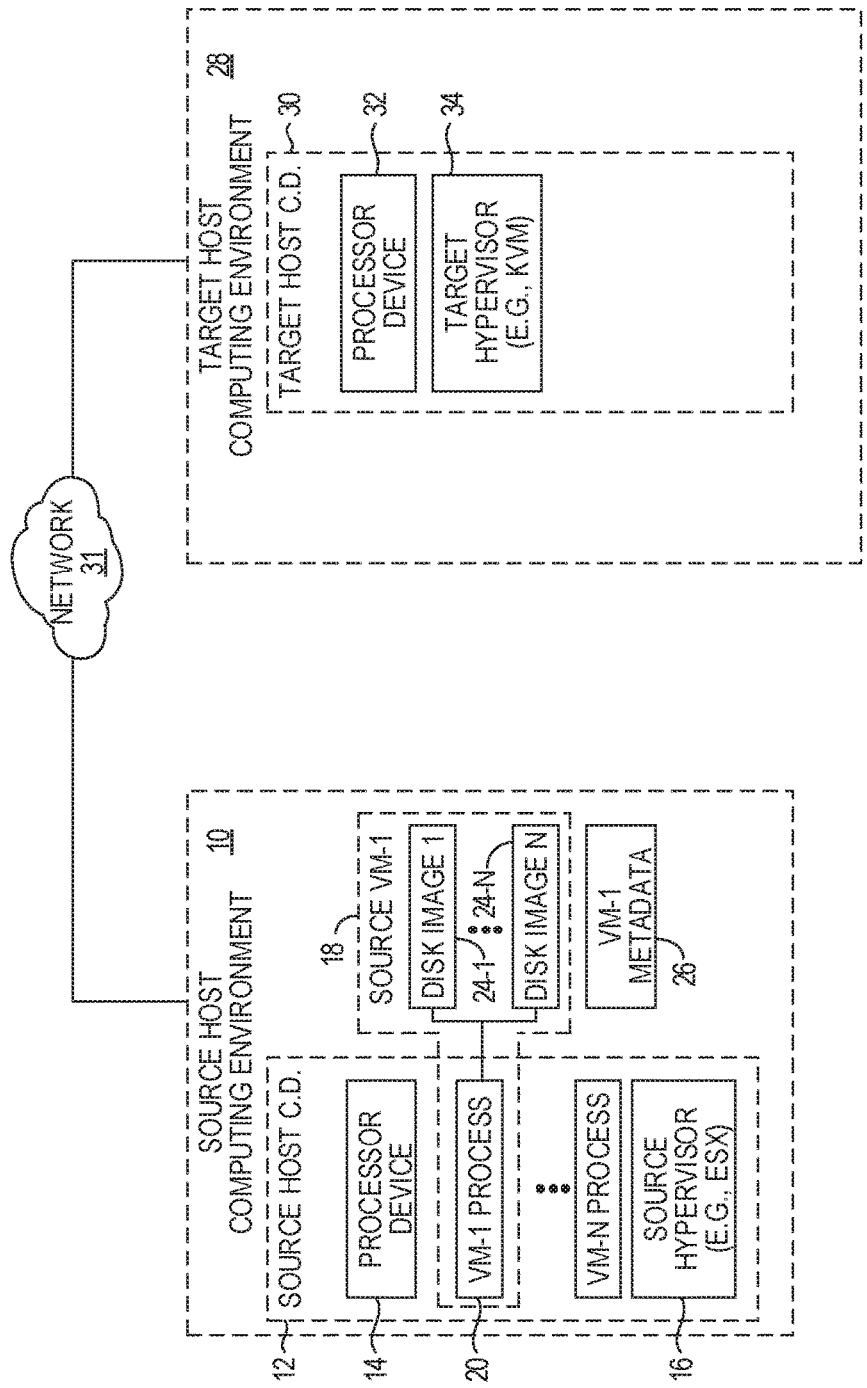
FIGS. 1A-1F are block diagrams that illustrate a sequence of events for cross-hypervisor virtual machine conversion according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Virtual machines operate in conjunction with a particular hypervisor. There are circumstances where it would be desirable to convert an existing virtual machine to be able to operate in conjunction with a different hypervisor than the hypervisor with which the virtual machine is currently configured to operate. This is sometimes referred to as cross-hypervisor conversion of a virtual machine.

As an example of such a circumstance, a business entity may offer services via a first cloud computing environment that utilizes a first hypervisor to initiate virtual machines to provide the desired services. The business entity may desire to move a virtual machine from the first cloud computing environment to a second cloud computing environment that utilizes a different type of hypervisor than the first hypervisor to initiate virtual machines. For example, the first hypervisor may be a VMware® ESXi® hypervisor, and the second hypervisor may be a Linux® kernel-based virtual machine (KVM) hypervisor.

A virtual machine may include a substantial amount of disk data. Converting a virtual machine that is configured to operate with one type of hypervisor to a virtual machine that can operate with a different type of hypervisor involves shutting the virtual machine down, copying the disk data that makes up the virtual machine to a target host computing environment, performing necessary conversion steps, and reinitiating the virtual machine in the target host computing environment. Depending on the size of the disk data that makes up the virtual machine, this can take a substantial amount of time, during which time services cannot be provided by the virtual machine.

The examples disclosed herein substantially reduce the amount of time that a virtual machine need be shut down during a cross-hypervisor virtual machine conversion. In particular, the examples disclosed herein determine, in a source host computing environment, a set of one or more disk images that define a virtual machine that is configured to operate in conjunction with a first type of hypervisor. Overlay images that refer back to the corresponding disk images in the source host computing environment are created. Necessary modifications are made to the overlay images to configure the virtual machine to operate with a second, different type of hypervisor. The virtual machine is then initiated in a target host computing environment by the second hypervisor from the overlay images prior to the disk images in the source host computing environment being copied to the target host computing environment. As the virtual machine runs and provides services, the disk images from the source host computing environment are copied and merged with the corresponding overlay images to form merged disk images.

FIGS. 1A-1F are block diagrams that illustrate a sequence of events for cross-hypervisor virtual machine conversion according to one implementation. Referring first to FIG. 1A, a source host computing environment 10 includes a source host computing device 12. The source host computing environment 10 may include, by way of non-limiting example, a third-party cloud computing environment, such as an AWS® cloud computing environment or an Azure® cloud computing environment that provides entities, such as businesses, with on-demand computing resources. In such implementations, the source host computing environment 10 may include hundreds or thousands of host computing devices that are substantially similar to the source host computing device 12. In other implementations, the source host computing environment 10 may not be a cloud computing environment and may comprise solely the source host computing device 12.

The source host computing device 12 includes a processor device 14, a memory (not illustrated), and virtualization technology, including a source hypervisor 16, that is configured to initiate a source virtual machine 18 on the source host computing device 12. The source hypervisor 16 is a first type of hypervisor and may include any suitable hypervisor such as, by way of non-limiting example, a VMWare® ESX® or ESXi® hypervisor. As used herein, two hypervisors are of different types if one hypervisor can successfully initiate a virtual machine process from a set of virtual machine disk images, but the other hypervisor cannot successfully initiate a virtual machine process from the same set of virtual machine disk images without modification. The source VM 18 comprises, at the instant in time illustrated in FIG. 1A, a running VM process 20, and a set of disk images 24-1-24-N. When the source VM 18 includes a running VM process such as the VM process 20, the source VM 18 also includes the memory utilized by the VM process 20. If the source VM 18 is shut down, the VM process 20 is terminated, and the set of disk images 24-1-24-N define the source VM 18. In this example, the disk image 24-1 is a boot disk image that the source hypervisor 16 uses to initiate the VM process 20. Thus, the disk image 24-1 includes the software necessary for the VM process 20 to initiate (e.g., boot), such as the particular operating system that the VM process 20 utilizes. While in this example the set of disk images 24-1-24-N comprises a plurality of disk images, in other examples a set of disk images may comprise a single disk image.

Source virtual machine metadata 26 is associated with the source VM 18 and contains information used by the source hypervisor 16 to initiate the VM process 20 from the set of disk images 24-1-24-N, including, by way of non-limiting example, the number of virtual processor devices that should be allocated to the VM process 20, the amount of memory that should be allocated to the VM process 20, the locations of the disk images 24-1-24-N, and any other desired information suitable for initiating and defining the source host computing environment 10 in which the VM process 20 is to be initiated. The source VM 18 is configured such that the VM process 20 can be initiated by the source hypervisor 16, and the VM process 20 could not be successfully initiated by a different type of hypervisor without modification of the source VM 18.

For purposes of illustrating cross-hypervisor virtual machine conversion according to one example, it will be assumed that it is desired that the source VM 18 be moved from the source host computing environment 10 to a target host computing environment 28 that includes a target host computing device 30 and that utilizes a second type of hypervisor. The source host computing environment 10 is communicatively coupled to the target host computing environment 28 via a network 31. The target host computing environment 28 may comprise a different third-party cloud computing environment that provides entities, such as businesses, on-demand computing resources, but that uses a different virtualization technology than that used by the source host computing environment 10, and that uses a different hypervisor than the source hypervisor 16 and thus cannot initiate a VM process from the source VM 18 without modification. In other implementations, the target host computing environment 28 may not be a cloud computing environment and may comprise solely the target host computing device 30. The target host computing device 30 includes a processor device 32, a memory (not illustrated), and virtualization technology, including a target hypervisor 34, that is configured to initiate a virtual machine process on the target host computing device 30. The target hypervisor 34 may comprise any suitable hypervisor such as, by way of non-limiting example, a Linux KVM® hypervisor or other suitable hypervisor, but the target hypervisor 34 is a different type of hypervisor than the source hypervisor 16. The terms "source" and "target" as used herein do not imply any particular characteristic and are used solely to easily distinguish the various components in the two different host computing environments 10, 28.

Figure 1B:
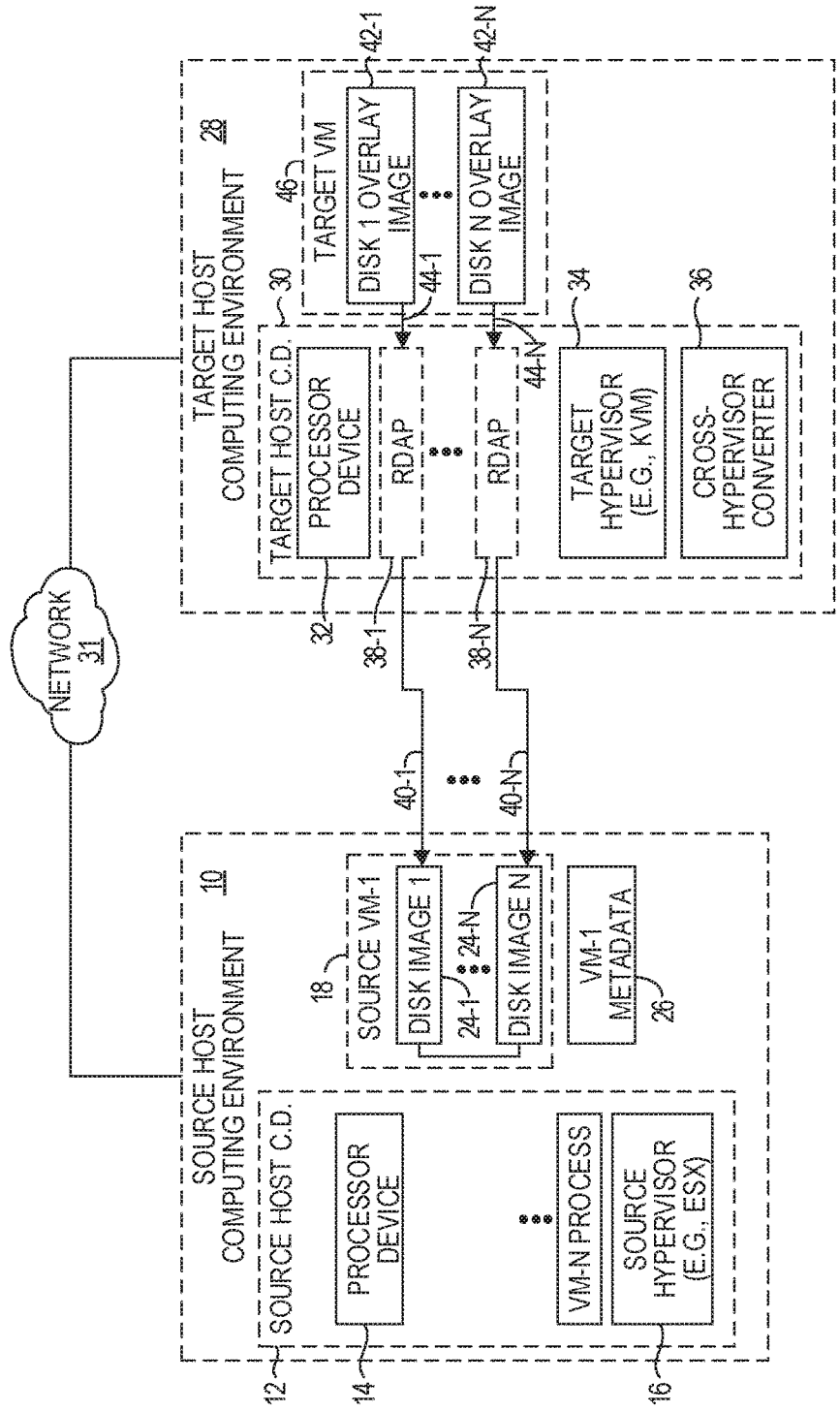

Referring now to FIG. 1B, an operator initiates a cross-hypervisor converter 36 that is configured to facilitate a cross-hypervisor virtual machine conversion in accordance with the examples disclosed herein. While for purposes of illustration and simplicity the steps discussed herein will generally be attributed to the cross-hypervisor converter 36, it will be appreciated that in other implementations the cross-hypervisor converter 36 may comprise multiple different tasks that are initiated to handle certain of the steps described herein, and in some implementations, certain of the steps may be initiated in response to commands issued by an operator to a computing device.

Because the cross-hypervisor converter 36 is a component of the target host computing device 30, functionality implemented by the cross-hypervisor converter 36 may be attributed to the target host computing device 30 generally. Moreover, in examples where the cross-hypervisor converter 36 comprises software instructions that program the processor device 32 to carry out functionality discussed herein, functionality implemented by the cross-hypervisor converter 36 may be attributed herein to the processor device 32. While for purposes of illustration the cross-hypervisor converter 36 is illustrated as being initiated on the target host computing device 30, in other implementations the cross-hypervisor converter 36 may be initiated on another computing device. In some implementations, the target hypervisor 34 may initiate the cross-hypervisor converter 36 in a virtual machine on the target host computing device 30.

The cross-hypervisor converter 36 is directed to the source VM 18 on the source host computing device 12 in some desired manner, such as via runtime parameters or via a user interface. The source VM 18 has at least two different states, a running state and a shut down state. When in a shut down state, the VM process 20 is not running. The cross-hypervisor converter 36 may first ensure that the source VM 18 is in the shut down state and thus that the VM process 20 is not running. In some implementations, an operator may first shut down the source VM 18 prior to directing the cross-hypervisor converter 36 to the source VM 18. In some implementations, the cross-hypervisor converter 36 may issue suitable commands to shut down the source VM 18.

The cross-hypervisor converter 36 accesses the source VM metadata 26 to determine the set of disk images 24-1-24-N that make up the source VM 18, and to determine which of the disk images 24-1-24-N comprises a boot disk image. In some implementations, the cross-hypervisor converter 36 may then initiate a plurality of remote disk access processes (RDAPs) 38-1-38-N that are configured to facilitate remote (e.g., network) access to corresponding disk images 24-1-24-N, as illustrated via arrows 40-1-40-N. The use of RDAPs 38-1-38-N is particularly useful where the source host computing environment 10 and the target host computing environment 28 utilize completely independent disk storage systems that are accessible only via a network. In other environments, the RDAPs 38-1-38-N may not be necessary.

In this particular example, the RDAP 38-1 corresponds to the disk image 24-1 and is configured to facilitate remote access, via the network 31, of the disk image 24-1 from the target host computing environment 28. The RDAPs 38-1-38-N may comprise any suitable technology that is capable of facilitating remote disk access from one computing environment to another computing environment. In one implementation, the RDAPs 38-1-38-N comprise nbdkit, a network block device technology, available at github.com/libguestfs/nbdkit.

The cross-hypervisor converter 36 generates overlay images 42-1-42-N that correspond to the disk images 24-1-24-N and that reference the disk images 24-1-24-N, in this example, via the corresponding RDAPs 38-1-38-N, as illustrated by arrows 44-1-44-N. In other examples, where the RDAPs 38-1-38-N are not utilized, the overlay images 42-1-42-N may reference the disk images 24-1-24-N directly. In this particular example, the overlay image 42-1 corresponds to the disk image 24-1 and references the disk image 24-1 via the RDAP 38-1, and the overlay image 42-N corresponds to the disk image 24-N and references the disk image 24-N via the RDAP 38-N. The overlay images 42-1-42-N may comprise any file format that implements copy-on-write functionality. In some examples, the overlay images 42-1-42-N comprise QEMU Copy On Write 2 (QCOW2) files, or VMware virtual disk (VMDK) files, and the disk images 24-1-24-N are the backing images of the overlay images 42-1-42-N. Initially, other than appropriate header data and/or metadata, the overlay images 42-1-42-N are empty and do not contain any of the content of the disk images 24-1-24-N. However, a computing process, such as the cross-hypervisor converter 36, that accesses an overlay image 42-1-42-N, although empty, will "see" the data on the corresponding disk image 24-1-24-N as if the cross-hypervisor converter 36 were accessing the disk image 24-1-24-N. Modifications made to a corresponding disk image 24-1-24-N via an overlay image 42-1-42-N, however, will be stored in the overlay image 42-1-42-N, and the corresponding disk image 24-1-24-N will not be modified. However, the disk image 24-1-24-N would subsequently appear modified to a computing process accessing the disk image 24-1-24-N via the corresponding overlay image 42-1-42-N. As discussed in greater detail below, after suitable modifications have been made to the overlay images 42-1-42-N, the overlay images 42-1-42-N will form a target VM 46 that contains sufficient modifications to allow the target VM 46 to be initiated by the target hypervisor 34.

Figure 1C:
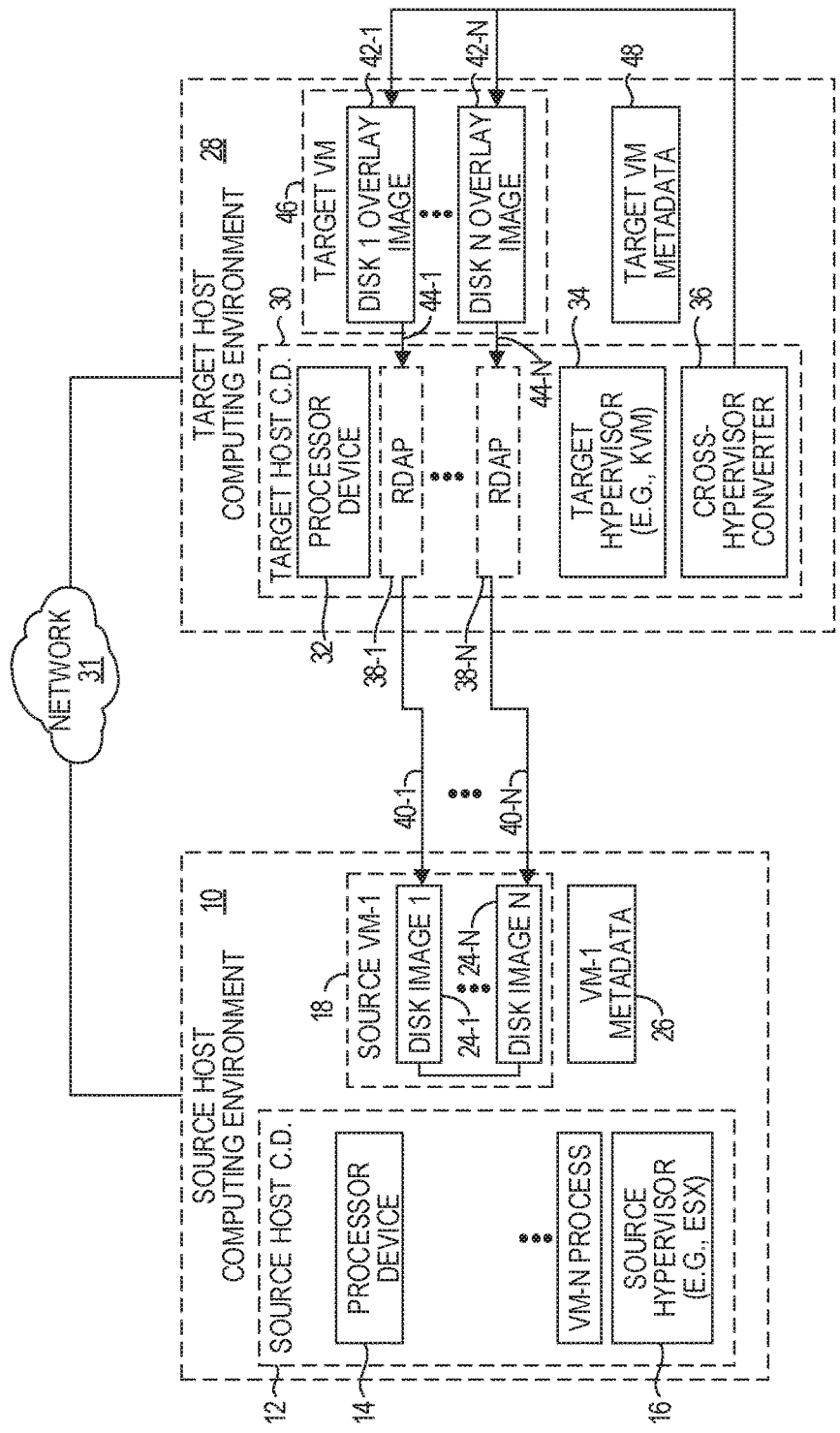

Referring now to FIG. 1C, the cross-hypervisor converter 36 accesses the disk images 24-1-24-N via the overlay images 42-1-42-N to determine what changes must be made to the disk images 24-1-24-N via the overlay images 42-1-42-N before the target VM 46 is configured to be able to be initiated by the target hypervisor 34. The specific changes may differ depending on the operating system used by the source VM 18, such as whether the operating system is the Windows® operating system or a Linux operating system for example. The specific changes may also differ depending on the particular source hypervisor 16 and the particular target hypervisor 34. The cross-hypervisor converter 36 then alters the overlay images 42-1-42-N to enable a target VM process to be booted from the overlay images 42-1-42-N on the target host computing device 30, as needed, based on the characteristics of the target hypervisor 34 and based on the content of one or more of the disk images 24-1-24-N. As discussed above, modifications stored in the overlay images 42-1-42-N, to a computing process accessing the overlay images 42-1-42-N, appear to be modifications of the disk images 24-1-24-N.

While, as discussed above, the particular modifications may differ depending on various characteristics of the target hypervisor 34, example modifications, where the guest operating system of the target VM 46 is the Windows® operating system, may include one or more of the following modifications based on the contents of the disk images 24-1-24-N:

- determine whether a Xen PV uninstaller tool is present, and if so, add "firstboot" script to the boot disk image (in this example, the overlay image 42-1 that corresponds to the disk image 24-1) which causes the Xen PV uninstaller tool to be executed during initiation/booting of a VM process from the target VM 46;
- determine whether a Parallels Tools uninstaller is present, and if so, add a "firstboot" script to the boot disk image which causes the Parallels Tools uninstaller tool to be executed during initiation/booting of a VM process the target VM 46;
- install, on the boot disk image, RHEV-APT (RHEV guest agent) and a "firstboot" script which causes the RHEV guest agent to be installed upon booting of a VM process from the target VM 46;
- modify the Windows HKLM\SYSTEM registry to disable autoreboot;
- install Virtio drivers on the boot disk image and modify the HKLM\SOFTWARE so that the virtio-blk driver is located automatically at boot; and
- fix NTFS drive headers if necessary.

Example modifications, where the guest operating system of the target VM 46 is the Linux operating system and the target hypervisor 34 is the KVM hypervisor may include one or more of the following modifications based on the contents of the disk images 24-1-24-N:

- modify the disk images 24-1-24-N to clean the RPM database;
- determine whether Xen PV drivers are installed, and if so, modify the disk images 24-1-24-N to uninstall the Xen PV drivers;
- if the Linux operating system is type SUSE, modify the disk images 24-1-24-N to move Xen modules from the list of initrd modules used by their mkinitrd;
- determine whether VirtualBox Guest Additions are installed, and if so, modify the disk images 24-1-24-N to uninstall the VirtualBox Guest Additions;
- determine whether VMware Tools are installed, and if so, modify the disk images 24-1-24-N to uninstall the VMware Tools;
- determine whether Citrix Xen drivers are installed, and if so, modify the disk images 24-1-24-N to uninstall the VMware Tools;
- modify the disk images 24-1-24-N to disable Kudzu;
- if the default booting kernel is a XenPV kernel, modify the disk images 24-1-24-N to change the grub configuration to make the default booting kernel to a kernel suitable for booting the target VM 46;
- modify the disk images 24-1-24-N to modify the console from /dev/hvc0, /dev/xvc0 (Xen) to /dev/ttyS0;
- modify the disk images 24-1-24-N to modify /etc/X11/xorg.conf (/etc/X11/XF86Config on certain releases of RHEL) to use QXL or Cirrus, depending on what drivers the new kernel supports;
- modify the disk images 24-1-24-N to update modules.conf (or conf.modules on certain releases of RHEL) to support the correct modules for eth0 and scsi_hostadapter, because KVM will emulate different network and disk devices;
- modify the disk images 24-1-24-N to rebuild the initrd, so that virtio drivers are available at boot; and
- modify the disk images 24-1-24-N such that SELinux labels on the disk images are restored.

Again, each of these modifications of the disk images 24-1-24-N are reflected in the overlay images 42-1-42-N, and the disk images 24-1-24-N are not directly modified. These and additional modifications may be made such as, by way of non-limiting example, installing a script that is configured to, upon execution, remove a software module installed on the disk images 24-1-24-N; install a script that is configured to, upon execution, install a software module that is not installed on the disk images 24-1-24-N; remove a software module that is installed on the disk images 24-1-24-N; and alter a configuration parameter to disable a feature that was enabled for the source VM 18. It is noted that the above-referenced modifications may take a relatively brief amount of time, from about 10 seconds to about two minutes depending on the number of modifications to the overlay images 42-1-42-N that are necessary.

The cross-hypervisor converter 36 also generates VM metadata 48 which contains information for the target hypervisor 34 to be able to initiate a VM process from the target VM 46, and parameters associated with a VM process initiated from the target VM 46, such as the locations of the overlay images 42-1-42-N, how many virtual processor devices should be allocated to a VM process initiated from the target VM 46, how much memory should be allocated to a VM process initiated from the target VM 46, devices used by a VM process initiated from the target VM 46 and how they are connected, how a VM process initiated from the target VM 46 can access a network, and the like.

Figure 1D:
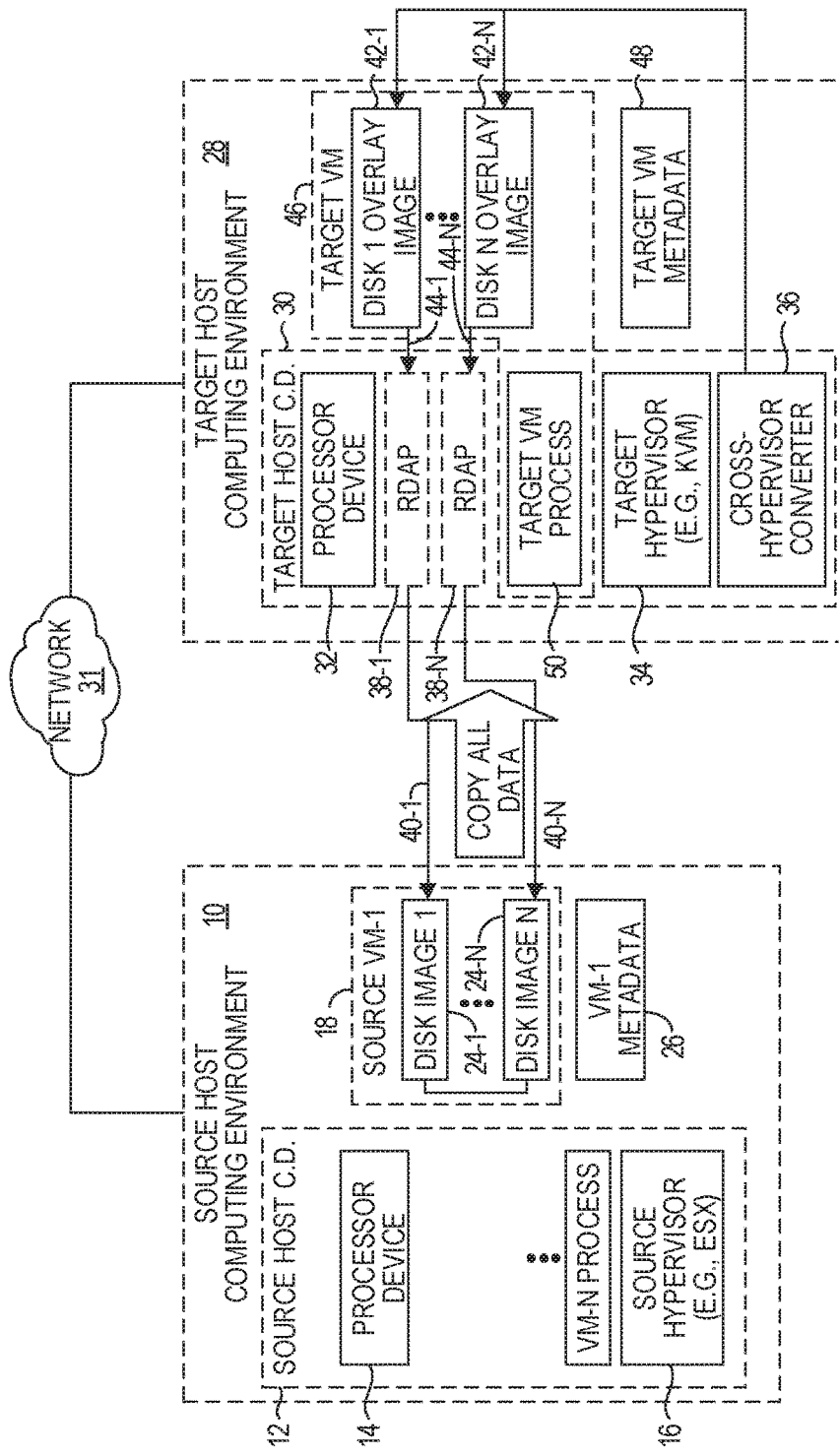

Referring now to FIG. 1D, the target hypervisor 34 initiates a target VM process 50 that boots from the overlay images 42-1-42-N. Notably, the data from the disk images 24-1-24-N has not been copied to the overlay images 42-1-42-N yet. The overlay images 42-1-42-N contain only the modifications made to the disk images 24-1-24-N necessary to allow the target VM process 50 to boot and execute in conjunction with the target hypervisor 34. Because the disk images 24-1-24-N have not yet been copied to the target host computing environment 28, the target VM 46 can be generated from the source VM 18 and modified, and the target VM process 50 can be booted in the target host computing environment 28 in a relatively small amount of time, such as in seconds or minutes, rather than what might otherwise take a relatively large amount of time during which all the data from the disk images 24-1-24-N is copied from the disk images 24-1-24-N to the target host computing environment 28.

Figure 1E:
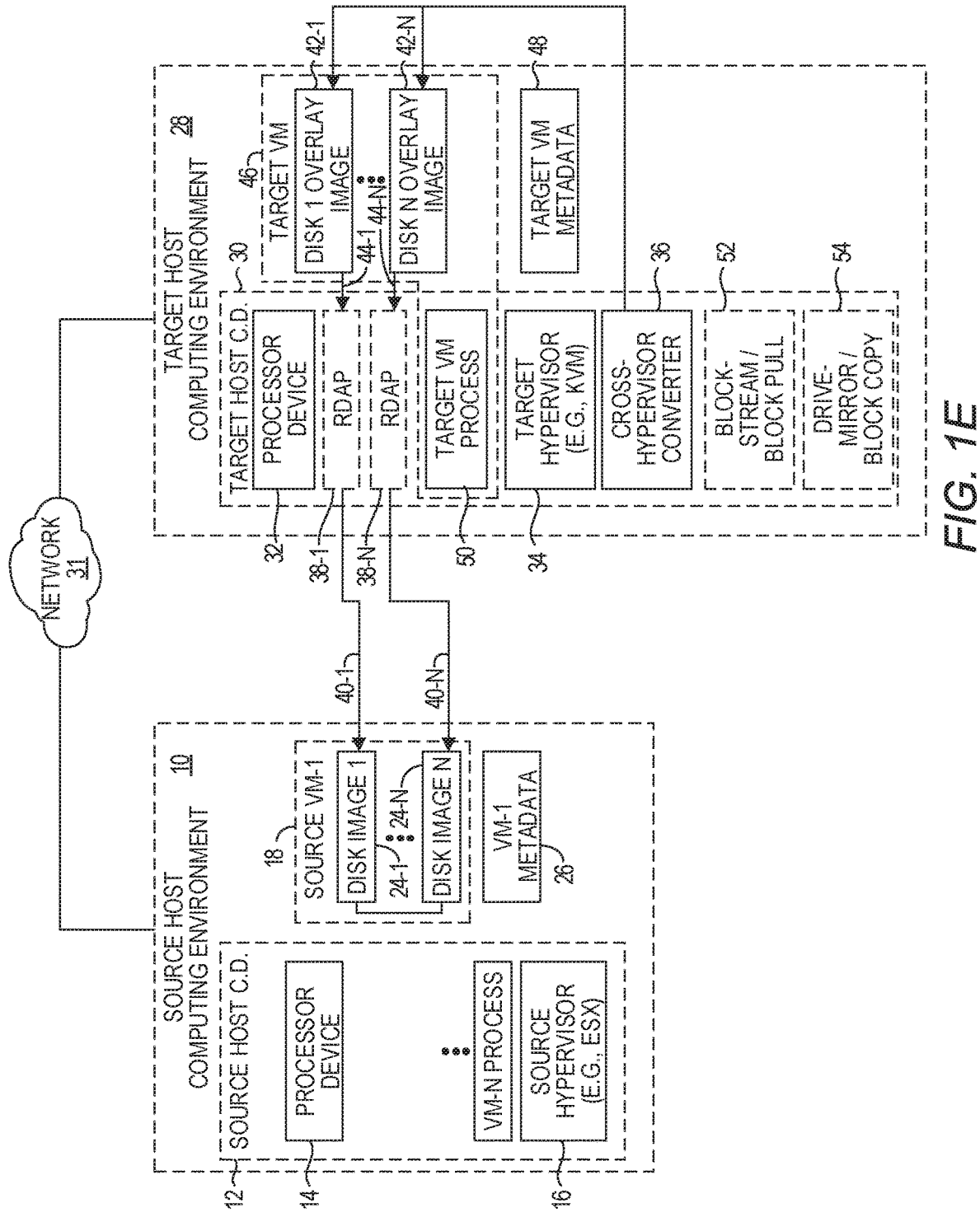

Referring now to FIG. 1E, the target VM process 50 is now capable of providing services in the target host computing environment 28 identical to those provided by the VM process 20 in the source host computing environment 10. The cross-hypervisor converter 36 begins one or more processes to copy the data from the disk images 24-1-24-N to the target host computing environment 28 and merge the data with the overlay images 42-1-42-N. This may be accomplished in any of several different manners depending on the particular target hypervisor 34 and/or target host computing environment 28. In one example, the cross-hypervisor converter 36 initiates a block-stream or block pull operation 52, which copies the data from the disk images 24-1-24-N to the overlay images 42-1-42-N concurrently, in the background, while the target VM process 50 is providing services. In another implementation, the cross-hypervisor converter 36 initiates a drive-mirror or block copy operation 54 which copies the data from the disk images 24-1-24-N to the overlay images 42-1-42-N concurrently while the target VM process 50 is providing services.

Figure 1F:
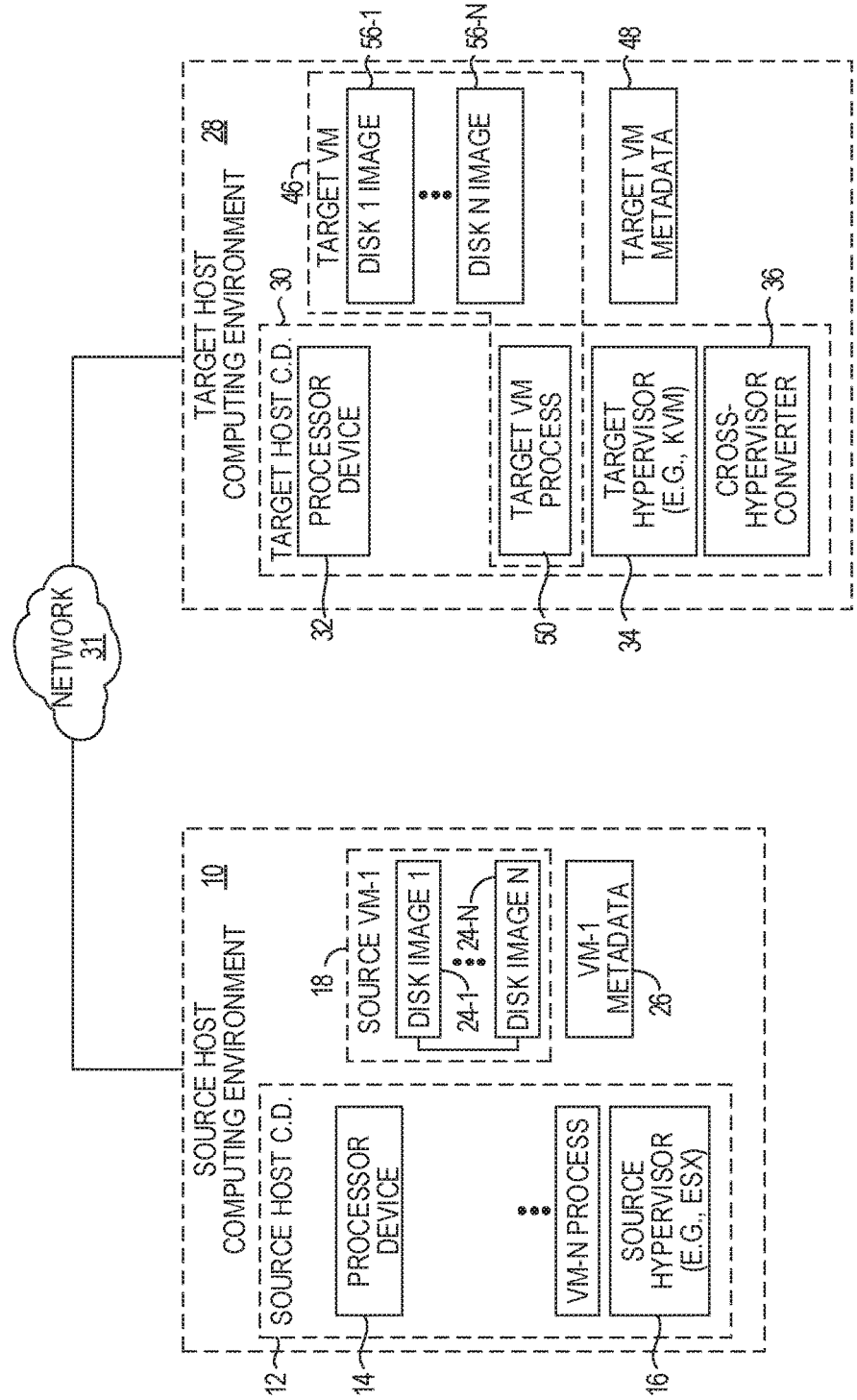

Referring now to FIG. 1F, the data from the disk images 24-1-24-N has been completely copied and merged with the overlay images 42-1-42-N. The cross-hypervisor converter 36 terminates the RDAPs 38-1-38-N and performs one or more actions to modify the overlay images 42-1-42-N to change the overlay images 42-1-42-N from overlay images that refer to the disk images 24-1-24-N to stand alone disk images 56-1-56-N.

Figure 2:
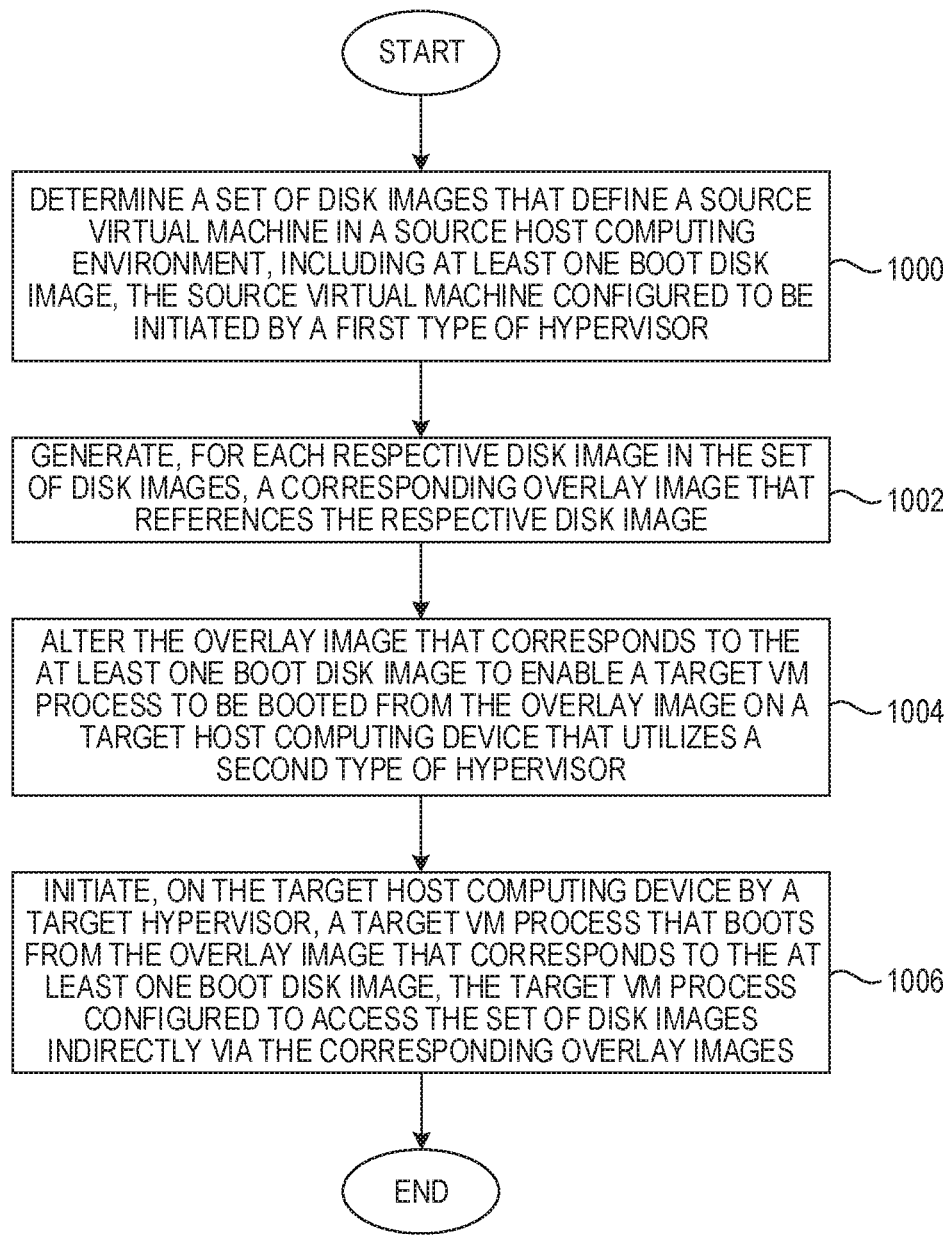
FIG. 2 is a flowchart of a method for cross-hypervisor virtual machine conversion according to one implementation.

FIG. 2 is a flowchart of a method for cross-hypervisor virtual machine conversion according to one implementation. FIG. 2 will be discussed in conjunction with FIG. 1. The cross-hypervisor converter 36 determines the set of disk images 24-1-24-N that define the source VM 18 in the source host computing environment 10, including the least one boot disk image 24-1. The source VM is configured to be initiated by a first type of hypervisor (FIG. 2, block 1000). The cross-hypervisor converter 36 generates, for each respective disk image 24-1-24-N, a corresponding overlay image 42-1-42-N that references the respective disk image 24-1-24-N (FIG. 2, block 1002). As discussed above, the reference to the respective disk image 24-1-24-N can be an indirect reference, via the RDAPs 38-1-38-N, or can directly reference the disk images 24-1-24-N. The cross-hypervisor converter 36 alters the overlay image 42-1-42-N that corresponds to the at least one boot disk image to enable the target VM process 50 to be booted from the overlay image 42-1-42-N on the target host computing device 30 that utilizes a second type of hypervisor (FIG. 2, block 1004). The cross-hypervisor converter 36 initiates, on the target host computing device 30 by the target hypervisor 34, the target VM process 50 that boots from the overlay image 42-1-42-N that corresponds to the at least one boot disk image. The target VM process 50 is configured to access the set of disk images 24-1-24-N indirectly via the corresponding overlay images 42-1-42-N (FIG. 2, block 1006).

Figure 3:
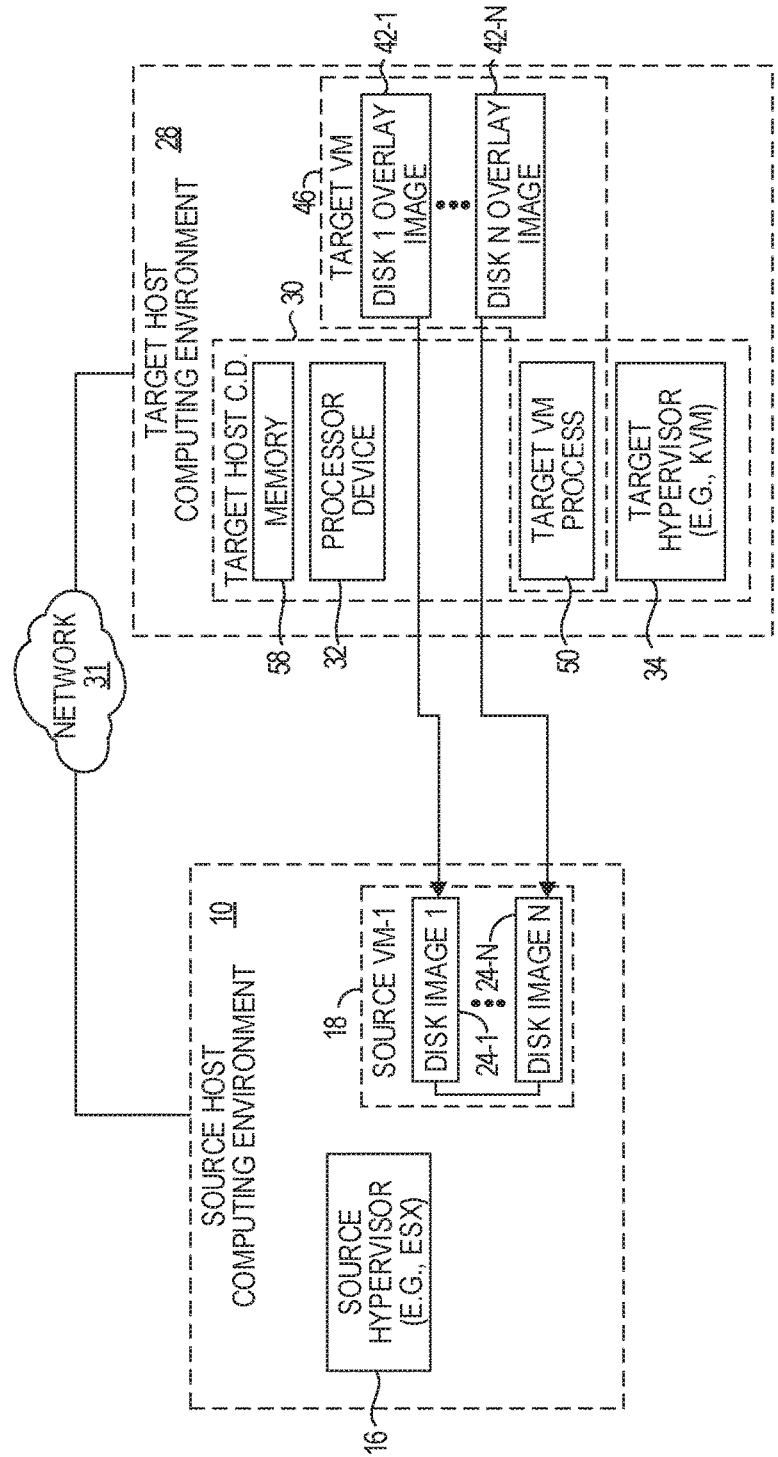
FIG. 3 is a simplified block diagram illustrating a source host computing environment and a target host computing environment illustrated in FIG. 1 according to one example.

FIG. 3 is a simplified block diagram illustrating the source host computing environment 10 and the target host computing environment 28 illustrated in FIG. 1 according to one example. In this example the target host computing device 30 includes a memory 58 and the processor device 32 coupled to the memory 58. The processor device 32 is to determine the set of disk images 24-1-24-N that define the source VM 18 in the source host computing environment 10, including at least one boot disk image, the source VM 18 configured to be initiated by a first type of hypervisor. The processor device 32 is further to generate, for each respective disk image 24-1-24-N, a corresponding overlay image 42-1-42-N that references the respective disk image 24-1-24-N. The processor device 32 is further to alter the overlay image 42-1-42-N that corresponds to the at least one boot disk image to enable a target VM process 50 to be booted from the overlay image 42-1-42-N on the target host computing device 30 that utilizes a second type of hypervisor. The processor device 32 is further to initiate, on the target host computing device 30 by the target hypervisor 34, the target VM process 50 that boots from the overlay image 42-1-42-N that corresponds to the at least one boot disk image. The target VM process 50 is configured to access the set of disk images 24-1-24-N indirectly via the corresponding overlay images 42-1-42-N.

Figure 4:
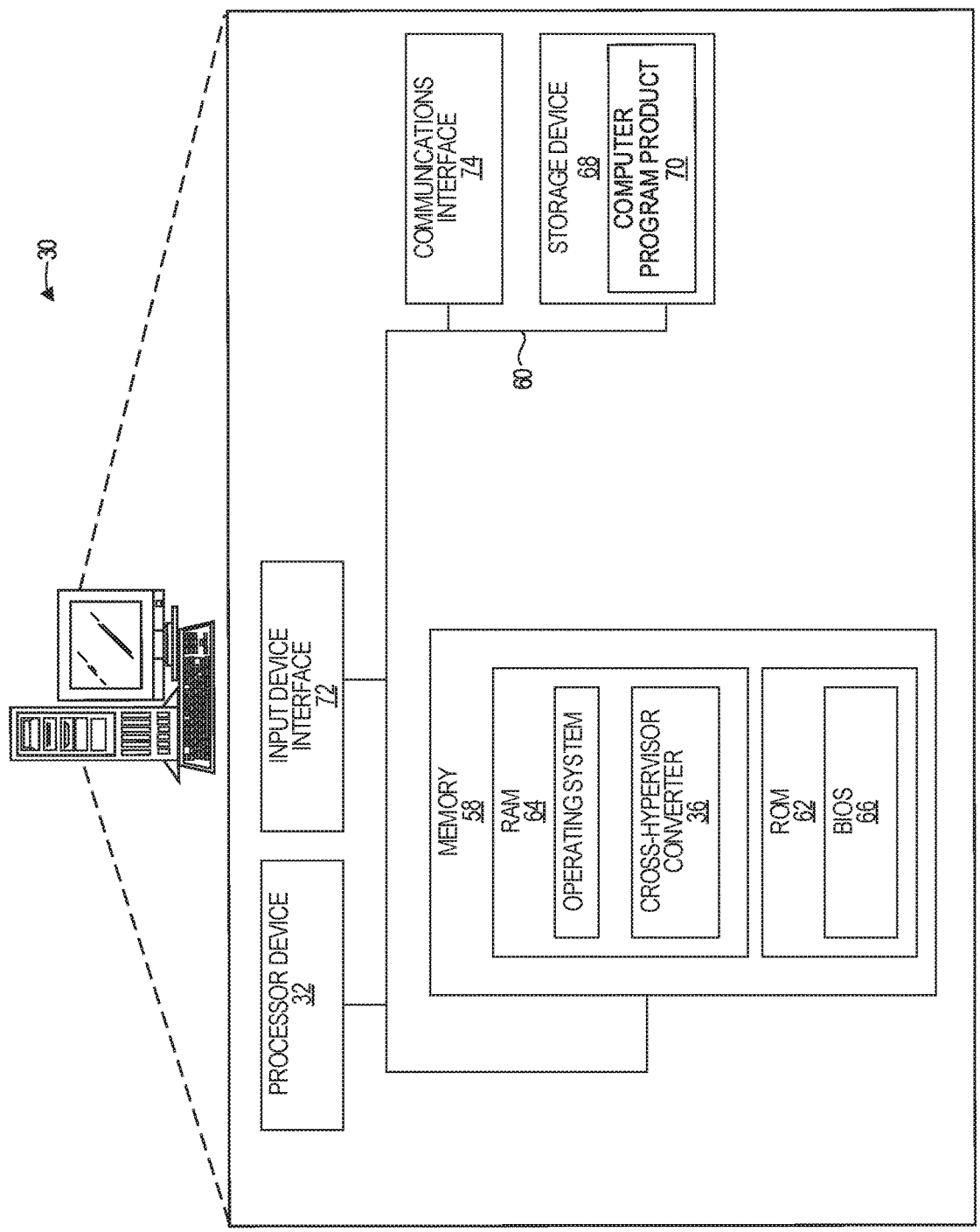
FIG. 4 is a block diagram of a target host computing device suitable for implementing examples according to one example.

FIG. 4 is a block diagram of the target host computing device 30 suitable for implementing examples according to one example. The target host computing device 30 may comprise any computing or electronic device capable of including firmware, hardware, and/or executing software instructions to implement the functionality described herein, such as a computer server, a desktop computing device, or the like. The target host computing device 30 includes the processor device 32, the memory 58, and a system bus 60. The system bus 60 provides an interface for system components including, but not limited to, the memory 58 and the processor device 32. The processor device 32 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The memory 58 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the target host computing device 30. The volatile memory 64 may also include a high-speed RAM, such as static RAM, for caching data.

The target host computing device 30 may further include or be coupled to a non-transitory computer-readable storage medium such as a storage device 68, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 68 and other drives associated with computer-readable media and computer-usable media may provide non-volatile storage of data, data structures, computer-executable instructions, and the like, including, for example, the target VM 46. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 68 and in the volatile memory 64, including an operating system and one or more program modules, such as the cross-hypervisor converter 36, which may implement the functionality described herein in whole or in part.

All or a portion of the examples may be implemented as a computer program product 70 stored on a transitory or non-transitory computer-usable or computer-readable storage medium, such as the storage device 68, which includes complex programming instructions, such as complex computer-readable program code, to cause the processor device 32 to carry out the steps described herein. Thus, the computer-readable program code can comprise software instructions for implementing the functionality of the examples described herein when executed on the processor device 32. The processor device 32, in conjunction with the cross-hypervisor converter 36 in the volatile memory 64, may serve as a controller, or control system, for the target host computing device 30 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 32 through an input device interface 72 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like.

The target host computing device 30 may also include a communications interface 74 suitable for communicating with the network 31 as appropriate or desired.

While, for purposes of illustration and simplicity, the cross-hypervisor converter 36 has been illustrated as being implemented on the target host computing device 30, in other examples the cross-hypervisor converter 36 can be executed on another computing device to cause the source VM 18 to be moved to the target host computing device 30 and converted in the manner discussed above.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a computing device comprising a processor device, a set of disk images that define a source virtual machine (VM) in a source host computing environment, including at least one boot disk image, the source VM configured to be initiated by a first type of hypervisor;
   generating, for each respective disk image in the set of disk images, a corresponding overlay image that references the respective disk image;
   altering the overlay image that corresponds to the at least one boot disk image to enable a target VM process to be booted from the overlay image on a target host computing device that utilizes a second type of hypervisor; and
   initiating, on the target host computing device by a target hypervisor, a target VM process that boots from the overlay image that corresponds to the at least one boot disk image, the target VM process configured to access the set of disk images indirectly via the corresponding overlay images.

2. The method of claim 1 further comprising:
   for each respective disk image in the set of disk images:
      causing data from each disk image to be copied to a location to be merged with the corresponding overlay image concurrently while the target VM process executes.

3. The method of claim 2 further comprising, for each respective disk image in the set of disk images, merging the data from the respective disk image with the corresponding overlay image to form a merged disk image.

4. The method of claim 3 wherein merging the data from the respective disk image with the corresponding overlay image to form the merged disk image further comprises issuing a block stream operation to stream the data from the respective disk image to the corresponding overlay image.

5. The method of claim 1 wherein determining the set of disk images that define the source VM in the source host computing environment comprises accessing source VM metadata that identifies the set of disk images that define the source VM.

6. The method of claim 1 further comprising:
   initiating, for each respective disk image in the set of disk images, a corresponding remote disk access process configured to allow remote access to the respective disk image; and
   wherein generating, for each respective disk image in the set of disk images, the corresponding overlay image that references the respective disk image comprises generating, for each respective disk image in the set of disk images, the corresponding overlay image that references the respective disk image via the corresponding remote disk access process.

7. The method of claim 6 wherein initiating the corresponding remote disk access process comprises initiating, for each respective disk image, a corresponding network block device configured to facilitate remote access to the respective disk image.

8. The method of claim 1 wherein generating, for each respective disk image in the set of disk images, the corresponding overlay image that references the respective disk image comprises generating, for each respective disk image in the set of disk images, a QEMU Copy On Write 2 (QCOW2) or VMware virtual disk (VMDK) overlay image that references the respective disk image.

9. The method of claim 1 wherein altering the overlay image comprises installing, on the overlay image that corresponds to the at least one boot disk image, a script to be executed upon initiation of the target VM process.

10. The method of claim 9 wherein the script is configured to, upon execution, remove a software module that is installed on the set of disk images.

11. The method of claim 9 wherein the script is configured to, upon execution, install a software module that is not installed on the set of disk images.

12. The method of claim 1 wherein altering the overlay image comprises removing a software module that is installed on the set of disk images.

13. The method of claim 1 wherein altering the overlay image comprises altering a configuration parameter to disable a feature that was enabled for the source VM.

14. The method of claim 1 further comprising:
   prior to initiating the target VM process, generating, for the target VM process, VM metadata that identifies one or more of a quantity of memory to be allocated for the target VM process, a quantity of virtual processor devices to be allocated for the target VM process, and locations of the set of overlay disk images.

15. The method of claim 1 wherein the first type of hypervisor is a VMware ESX or ESXi type hypervisor.

16. The method of claim 15 wherein the second type of hypervisor is a Linux kernel-based VM (KVM) type hypervisor.

17. A computing device, comprising:
   a memory; and
   a processor device coupled to the memory to:
      determine a set of disk images that define a source virtual machine (VM) in a source host computing environment, including at least one boot disk image, the source VM configured to be initiated by a first type of hypervisor;
      generate, for each respective disk image in the set of disk images, a corresponding overlay image that references the respective disk image;
      alter the overlay image that corresponds to the at least one boot disk image to enable a target VM process to be booted from the overlay image on a target host computing device that utilizes a second type of hypervisor; and
      initiate, on the target host computing device by a target hypervisor, a target VM process that boots from the overlay image that corresponds to the at least one boot disk image, the target VM process configured to access the set of disk images indirectly via the corresponding overlay images.

18. The computing device of claim 17 wherein the processor device is further to, for each respective disk image in the set of disk images, cause data from each disk image to be copied to a location to be merged with the corresponding overlay image concurrently while the target VM process executes.

19. The computing device of claim 17 wherein the processor device is further to:
   initiate, for each respective disk image in the set of disk images, a corresponding remote disk access process configured to allow remote access to the respective disk image; and
   wherein to generate, for each respective disk image in the set of disk images, the corresponding overlay image that references the respective disk image, the processor device is further to generate, for each respective disk image in the set of disk images, the corresponding overlay image that references the respective disk image via the corresponding remote disk access process.

20. A computer program product stored on a non-transitory computer-readable storage medium and including instructions configured to cause a processor device to:
   determine a set of disk images that define a source virtual machine (VM) in a source host computing environment, including at least one boot disk image, the source VM configured to be initiated by a first type of hypervisor;
   generate, for each respective disk image in the set of disk images, a corresponding overlay image that references the respective disk image;
   alter the overlay image that corresponds to the at least one boot disk image to enable a target VM process to be booted from the overlay image on a target host computing device that utilizes a second type of hypervisor; and
   initiate, on the target host computing device by a target hypervisor, a target VM process that boots from the overlay image that corresponds to the at least one boot disk image, the target VM process configured to access the set of disk images indirectly via the corresponding overlay images.

\* \* \* \* \*